United States Patent [19]

Wagner

[11] Patent Number: 4,613,273
[45] Date of Patent: Sep. 23, 1986

[54] SPARE TIRE HANDLING APPARATUS

[76] Inventor: John H. Wagner, 504 Academy, Paragould, Ark. 72450

[21] Appl. No.: 645,036

[22] Filed: Aug. 27, 1984

[51] Int. Cl.⁴ .................................................. B62D 43/04
[52] U.S. Cl. .................................. 414/463; 224/42.23; 254/343; 254/362
[58] Field of Search ............... 414/462, 463, 464, 465, 414/466, 559, 921, 786; 254/343, 362; 224/42.12, 42.21, 42.23; 464/120

[56] References Cited

U.S. PATENT DOCUMENTS

| | | | |
|---|---|---|---|
| 1,417,402 | 5/1922 | Mattern | 464/120 |
| 1,739,353 | 12/1929 | Criteser | 254/343 |
| 1,768,420 | 6/1930 | Rogers | 254/362 X |
| 2,661,130 | 12/1953 | Evans | 414/463 |
| 3,372,821 | 3/1968 | Podhajsky | 414/463 |
| 3,539,152 | 11/1970 | Paul et al. | 414/463 X |
| 3,658,299 | 4/1972 | Sprague | 254/343 |
| 4,272,218 | 6/1981 | Carter | 414/462 |
| 4,297,069 | 10/1981 | Worthington | 414/921 X |

FOREIGN PATENT DOCUMENTS 1113372  8/1961  Fed. Rep. of Germany ...... 414/463

Primary Examiner—Leslie J. Paperner
Attorney, Agent, or Firm—Walker & McKenzie

[57] ABSTRACT

An apparatus to aid in loading, holding and unloading a spare tire assembly mounted beneath a vehicle such as a truck. The apparatus includes a winch, an electric motor, coupling structure for operatively coupling the winch and motor, and an electric circuit which allows the motor and winch to be operated only by authorized personnel whereby the spare tire assembly can be safely secured underneath the vehicle.

10 Claims, 10 Drawing Figures

SPARE TIRE HANDLING APPARATUS

BACKGROUND OF THE INVENTION

1. Field of the Invention

The present invention relates in general to means for lifting, holding and lowering a spare tire assembly relative to the underside of a vehicle.

2. Description of the Prior Art

Heretofore, various apparatuses for handling and storing spare tire assemblies underneath vehicles have been developed. See, for example, Walker, U.S. Pat. No. 2,688,372; Fruetel, U.S. Pat. No. 3,395,819; Cluff, U.S. Pat. No. 3,554,397; Paul, U.S. Pat. No. 3,539,152; Wasue, U.S. Pat. No. 3,856,167; and Kuhns, U.S. Pat. No. 3,865,264. None of the above patents disclose or suggest the present invention.

SUMMARY OF THE INVENTION

The present invention is directed toward improving upon prior methods of and devices for loading, storing and unloading spare tire assemblies underneath a vehicle such as a truck or the like. The apparatus of the present invention comprises, in general, an attachment means for being attached to the spare tire assembly; winch means for being coupled to the attachment means; electric motor means having a selectively rotatable motor drive shaft; coupling means for coupling the motor drive shaft to the winch means and for allowing rotation of the motor drive shaft to cause the winch means to lift the attachment means and the spare tire assembly; and electrical energy means for selectively energizing the electric motor means to cause the motor drive shaft to rotate.

DESCRIPTION OF THE PREFERRED EMBODIMENT

Figure 1:
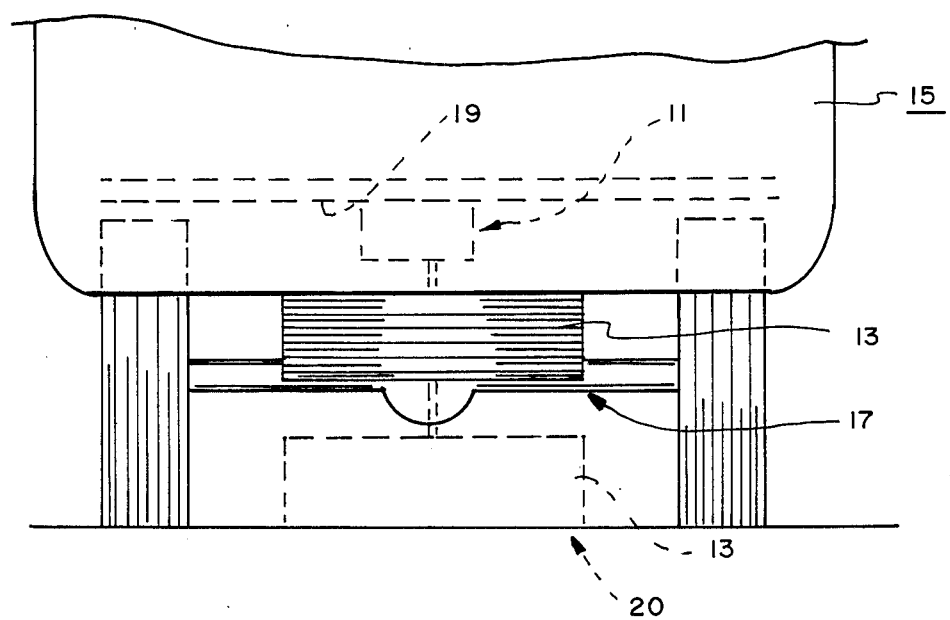
FIG. 1 is a somewhat diagrammatic rear elevational view of a truck with the apparatus of the present invention mounted thereon and with a spare tire assembly shown in broken lines in a lowered position.
Figure 2:
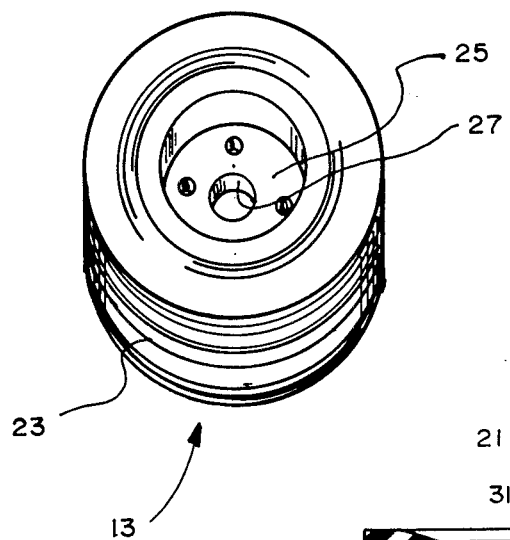
FIG. 2 is a perspective view of a spare tire assembly.
Figure 3:
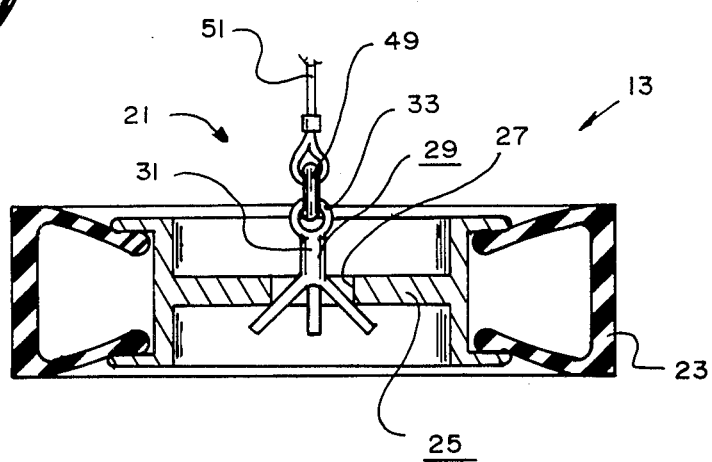
FIG. 3 is a sectional view of a spare tire assembly showing a portion of the apparatus of the present invention associated therewith.

The apparatus 11 of the present invention is for use with a typical spare tire assembly 13 of a vehicle 15 such as a truck, automobile or the like, to selectively lift and hold the spare tire assembly 13 in a stored or up position 17 relative to the underside 19 of the vehicle 15 and to allow the spare tire assembly 13 to be selectively lowered to a down position 20 where the spare tire asembly 13 can be removed from the apparatus 11 for use on the vehicle 15 to replace a flat tire or the like (see, in general, FIGS. 1-3).

The apparatus 11 includes an attachment means 21 for being attached to the spare tire assembly 13. The spare tire assembly 13 typically includes a tire 23 mounted on a metal wheel 25 having a central aperture 27 therethrough as will be apparent to those skilled in the art. The attachment means 21 preferably includes a hub member 29 for being removably attached to the spare tire assembly 13. More specifically, the hub member 29 may consist of a relatively bell-shaped structure having a lower end that will not pass through the central aperture 17 but having an apex 31 for extending upwardly through the central aperture 27 of the wheel 25 in such a manner that the spare tire assembly 13 can be lifted and held upwardly by way of the apex 31 of the hub member 29. A ring 33 or the like is preferably provided at the apex 31 of the hub member 29 for reasons which will hereinafter become apparent. The specific construction of the hub member 29 may vary as will not be apparent to those skilled in the art. Thus, for example, the hub member 29 may be formed of metal basically in a tripod manner of a plurality of outwardly and downwardly extending rigid arm members or the like and with a ring formed at or welded to the apex thereof.

Figure 4:
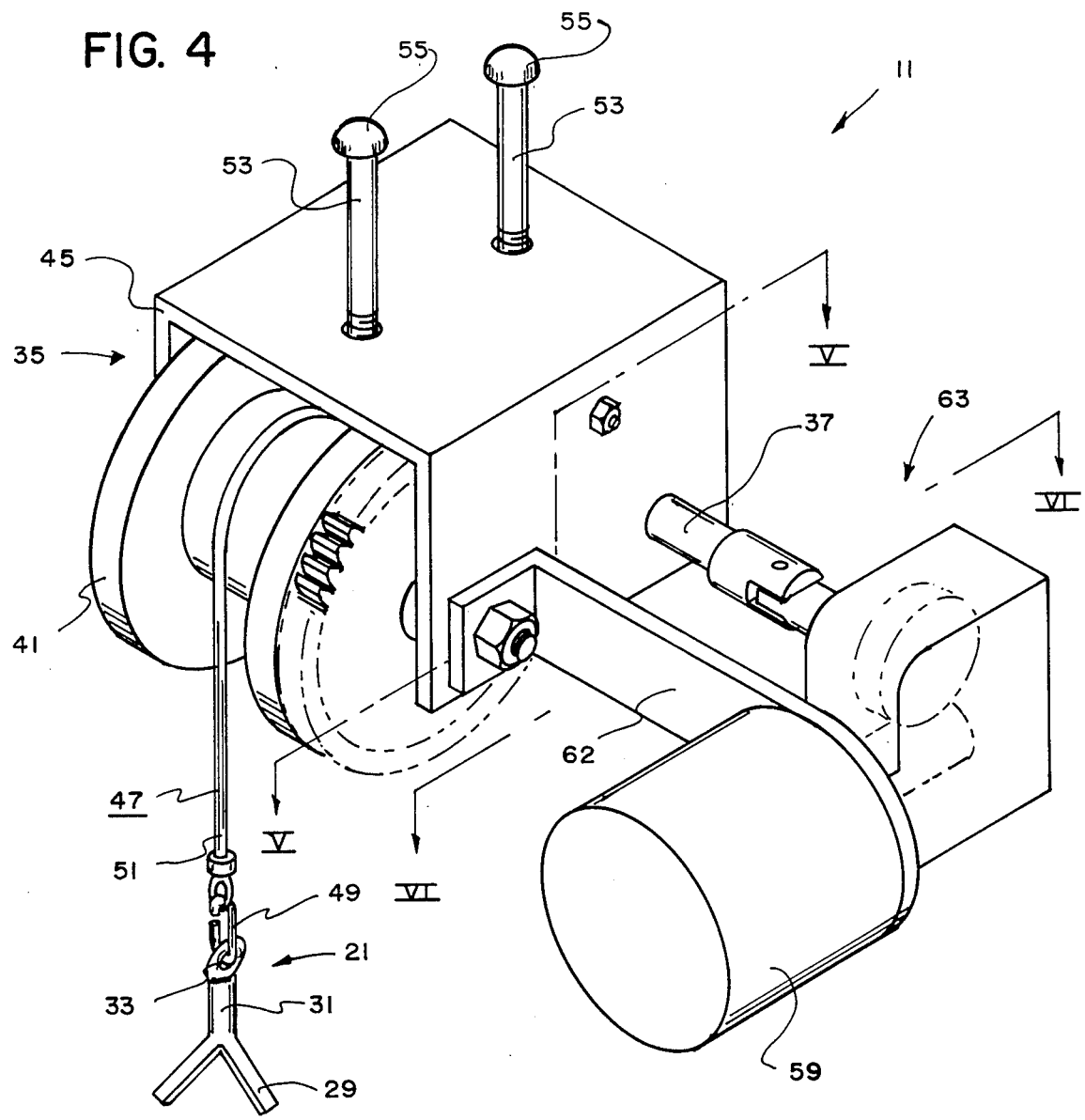
FIG. 4 is a perspective view of the apparatus of the present invention.
Figure 5:
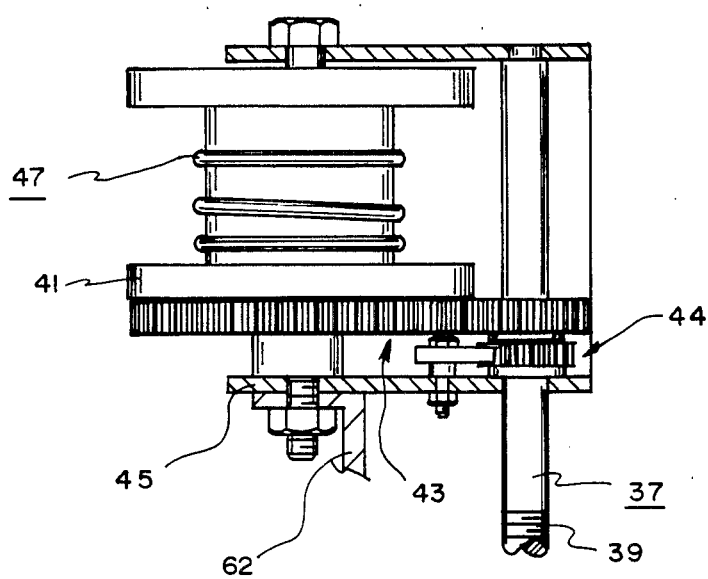
FIG. 5 is a sectional view substantially as taken on line V—V of FIG. 4 with portions thereof broken away for clarity.

The apparatus 11 includes a winch means 35 for being coupled to the attachment means 21 (see FIGS. 4 and 5). The winch means 35 may consist of a substantially typical winch such as the model DLB 800 winch manufactured by Dutton-Lainson Company of Hastings, Nebr. 68901 having a load capacity of 800 pounds. Generally, the winch means 35 includes a winch drive shaft 37 having a threaded distal end 39, a winch reel 41, gear train means 43 extending between the winch drive shaft 37 and the winch reel 41 whereby rotation of the drive shaft 37 is transferred to the reel 41, a ratchet means 44 for preventing unintentional "unwinding" of the reel 41, and a housing 45 or the like for being attached to the underside 19 of the vehicle 15 at a location where it is desired to store the spare tire assembly. An elongated cable member 47 is attached to the winch reel 41. The attachment means 21 preferably includes a snap member 49 for being fixedly attached to the distal end 51 of the cable member 47. The snap member 49 may be of any typical construction and is adapted to be removably attached to the ring 33 of the hub member 29 whereby the distal end 51 of the cable member 47 can be removably attached to the hub member 29 so that operation of the winch means 35 will be effective to move the spare tire assembly 13 between the up position 19 and down position 20 as will now be apparent to those skilled in the art. The specific attachment of the winch means 35 to the underside 19 of the vehicle 15 may vary in many manners as will now be apparent to those skilled in the art. For example, bolt means 53 may be provided for extending through a portion of the vehicle 15 and the housing 45 of the winch means 35 to thereby fixedly attach the winch means 35 to the underside 19 of the vehicle 15. The bolt means 53 are preferably constructed or arranged so as to prevent or deter the removal thereof when the spare tire assembly 13 is in the stored, up position 17. Thus each bolt means 53 may be provided with a smooth, rounded head 55 that cannot be easily gripped and may be arranged so that access to the nut thereof (not shown) is blocked by the spare tire assembly 13 when in the stored, up position 17.

Figure 6:
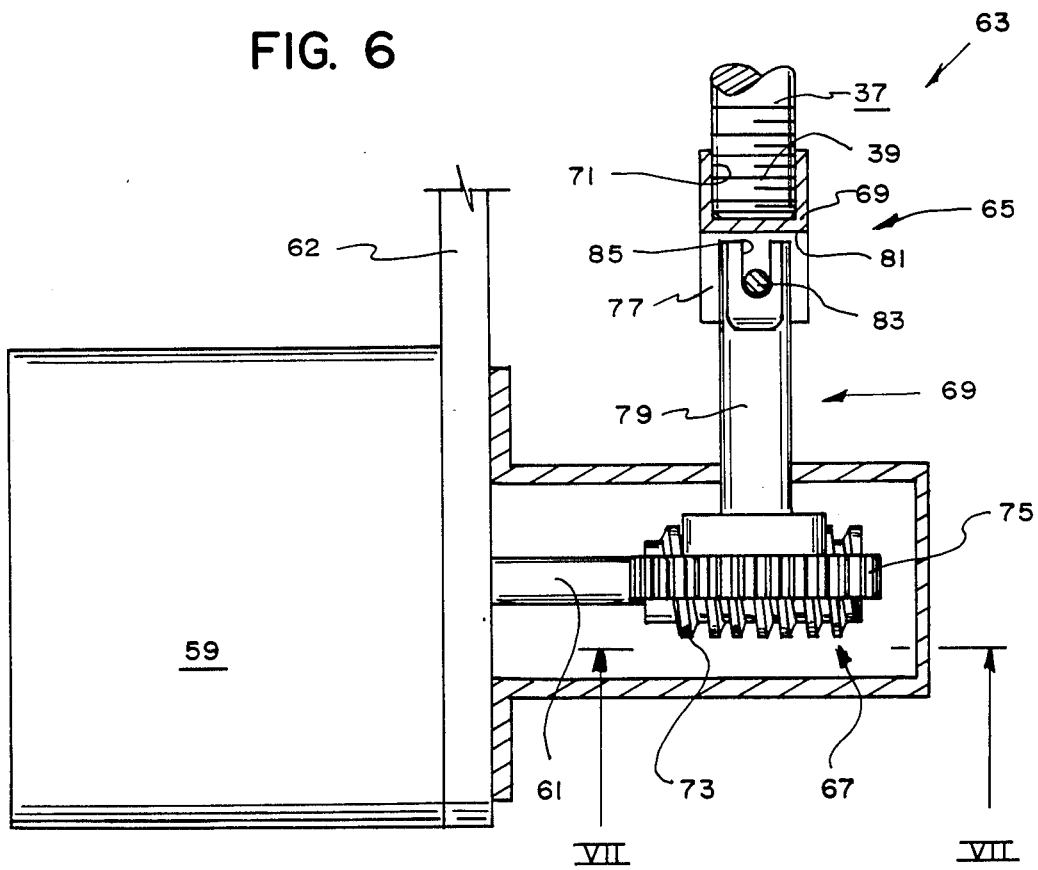
FIG. 6 is an enlarged sectional view substantially as taken on line VI—VI of FIG. 4 with portions thereof broken away for clarity.
Figure 7:
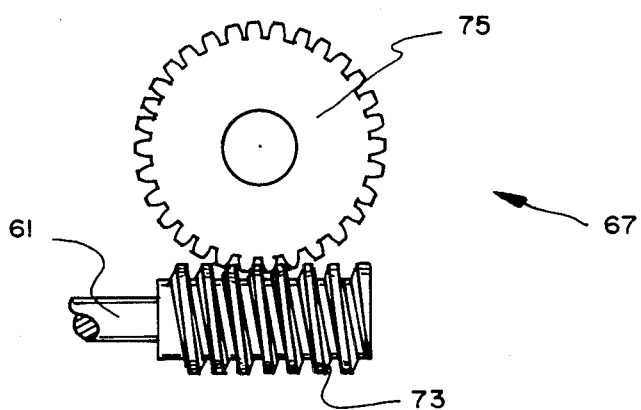
FIG. 7 is an elevational view substantially as taken on line VII—VII of FIG. 6 with portions thereof omitted for clarity.
Figure 8:
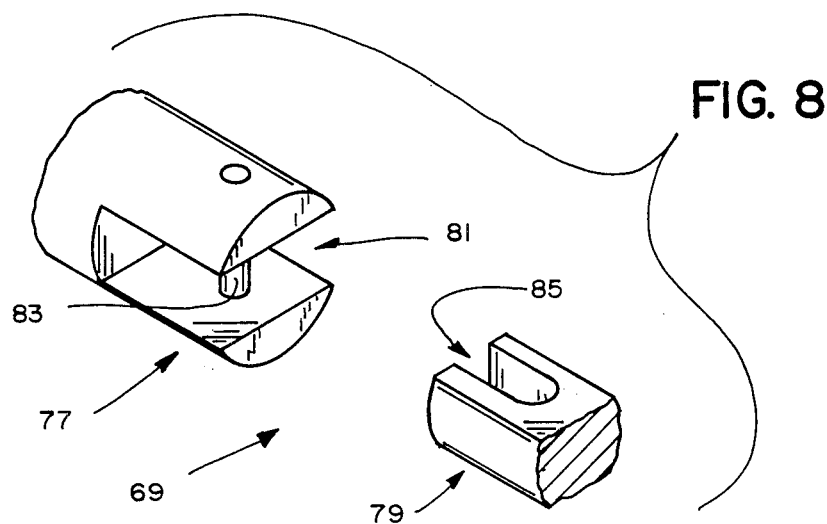
FIG. 8 is an exploded perspective view of certain components of the coupling means of the apparatus of the present invention.
Figure 9:
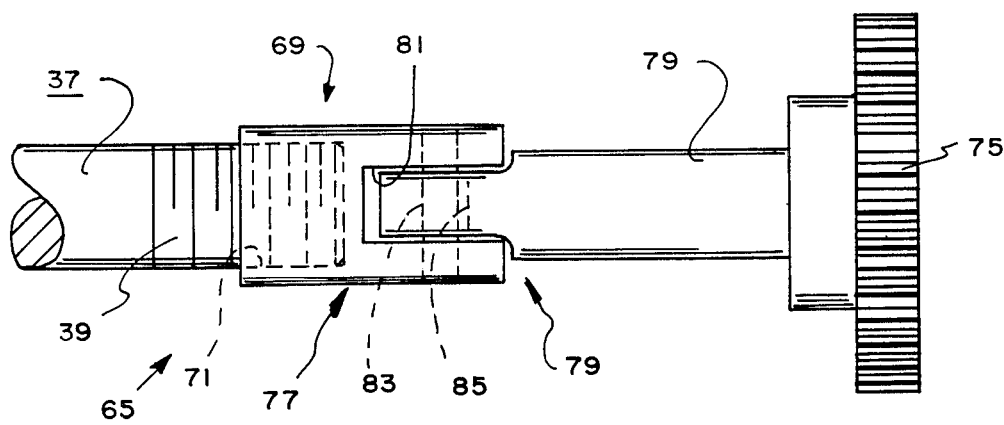
FIG. 9 is a side elevational view of certain components of the coupling means of the apparatus of the present invention.

The apparatus 11 includes an electric motor means 59 having a reversible motor drive shaft 61 that can be selectively rotated clockwise and counterclockwise (see FIGS. 4 and 6). The electric motor means 59 may be of any typical construction now apparent to those skilled in the art. Preferably, the electric motor means 59 is a typical 12 volt direct current electric motor for being operated by way of the electrical system of the vehicle 15 in a manner hereinafter to be explained. The electric motor means 61 may be attached to the housing 45 of the winch means 35 by a bracket 62 (see FIGS. 4 and 5).

The apparatus 11 includes a coupling means 63 for coupling the motor drive shaft 61 to the winch means 35 (see, in general, FIGS. 4 and 6) and for allowing rotation of the motor drive shaft 61 to cause the winch means 35 to lift, and lower, the attachment means 21 and the spare tire assembly 13. The coupling means 63 preferably includes a first coupling member 65 for being attached to the winch drive shaft 37, a second coupling member 67 for being operatively coupled to the motor drive shaft 61, and a joining means 69 operatively joining the first and second coupling member 65, 67 to one another for allowing the second connecting member 67 to transfer rotation from the motor drive shaft 61 to the first coupling member 65 and for allowing back and forth longitudinal movement of the first and second coupling members 65, 67 relative to one another (see FIGS. 4, 6, 8, and 9). The first coupling member 65 preferably has a threaded aperture 71 therein for allowing the first coupling member 65 to be screwed onto the threaded distal end 39 of the winch drive shaft 37.

The second coupling member 67 preferably includes a first gear member 73 for being fixedly attached to the motor drive shaft 61 and for being rotated therewith, and preferably includes a second gear member 75 for being operatively joined to the first coupling member 65 by the joining means 69 and for being rotated by the first gear member 73. The specific construction and ratio, etc., of the first and second gear members 73, 75 may vary as will now be apparent to those skilled in the art. Preferably, the first gear member 73 is a worm and the second gear member is a worm gear.

The joining means 69 preferably includes a first joining member 77 fixedly attached to the first coupling member 65 as by being constructed integral therewith for rotation therewith, and preferably includes a second joining member 79 fixedly attached to the second coupling member 67 as by being welded thereto for rotation therewith. The first joining member 77 has a longitudinal slot 81 therein for receiving the second joining member 79 and for allowing rotational movement to be transferred from the second joining member 79 to the first joining member 77 while allowing longitudinal movement of the first joining member 77 relative to the second joining member 79. The first joining member 77 preferably has a bar 83 for extending transversely across the slot 81 therein. The second joining member 79 preferably has a slot 85 therein for receiving the bar 83 of the first joining member 77 when the second joining member 79 is received in the slot 81 of the first joining member 77 to maintain alignment of the first and second joining members 77, 79.

Figure 10:
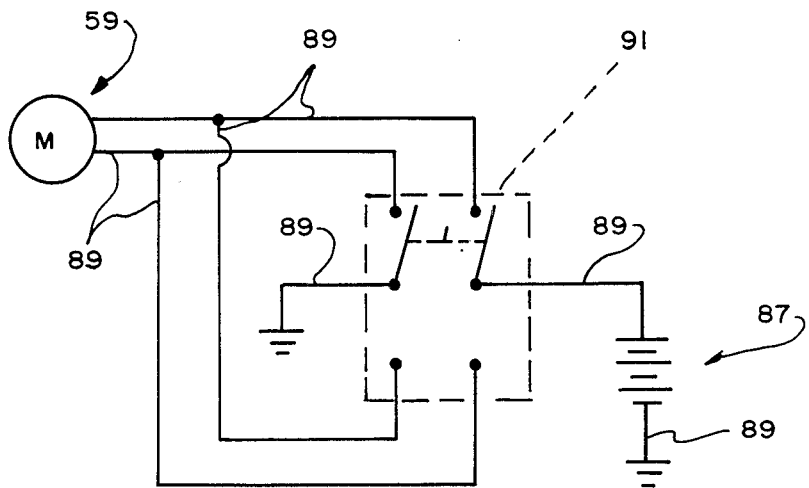
FIG. 10 is an electrical diagram of the electrical circuit of the apparatus of the present invention.

The apparatus 11 includes electrical energy means for selectively energizing the electric motor means 59 to cause the motor drive shaft 61 to rotate. The electrical energy means preferably includes a source of electrical energy such as the standard battery 87 of the vehicle 15, electrical conductor means 89 for allowing the transfer of electrical energy from the battery 87 to the electric motor means 59, and a switch means 91 interposed in the electrical conductor means 89 between the battery 87 and the electric motor means 59 for controlling the passage of electrical energy from the battery 87 to the electric motor means 59 (see FIG. 10). The switch means 91 may consist of a key operated switch for being located on the vehicle 15 adjacent the spare tire assembly 13 and for preventing unauthorized operation of the apparatus 11. On the other hand, the switch means 91 may include a standard toggle type switch member mounted within the interior of the vehicle 15 whereby one would need access into the interior of the vehicle 13 to operate the apparatus 11. In either case the switch means 91 preferably consists of a double pole, double throw switch member for allowing the electric motor means 59 to be activated to cause the motor drive shaft 61 to rotate in either a clockwise or counterclockwise direction. Such a double pole, double throw key operated switch member is manufactured by ALCO Switch of North Andover, Mass. 01845 and identified as Model CNK-206P.

To use the apparatus 11, the first step is to move the switch means 91 to the down position whereby the electric motor means 59 will be energized to cause the winch means 35 to release and lower the spare tire assembly 13 from the up position 17 to the down position 20. When sufficient cable has been played out, the switch means 91 can then be moved back to the open position and the snap member 49 of the attachment means 21 removed from the ring 33 of the hub member 29 thereof thus allowing the spare tire assembly 13 to be freed from the apparatus 11. To replace the spare tire assembly 13, the apex 31 of the hub member 29 is inserted through the central aperture 27 of the wheel 25 and the snap member 49 attached to the ring 33. The switch means 91 can then be moved to the up position to activate the electric motor means 59 so as to cause the winch means 35 to raise the spare tire assembly 13 from the down position 20 to the up position 17.

As thus constructed and used, the present invention provides a simple, economical, compact, easy to use and install unit that will quickly raise, hold and lower a spare tire assembly regardless of the size, weight, or location of the spare tire assembly.

Although the present invention has been described and illustrated with respect to a preferred embodiment thereof and a preferred use therefore, it is not to be so limited since changes and modifications can be made therein which are within the full intended scope of the invention.

I claim:

1. An apparatus for lifting and holding a spare tire assembly in a stored position relative to the underside of a vehicle and for lowering said spare tire assembly to a lowered position, said apparatus comprising, in combination:
   (a) attachment means attached to said spare tire assembly;
   (b) winch means coupled to said attachment means, said winch means including a winch drive shaft;

(c) electric motor means having a selectively rotatable motor drive shaft;

(d) coupling means including a first coupling member attached to said winch drive shaft and a second coupling member operatively coupled to said motor drive shaft for coupling said motor drive shaft to said winch means and for allowing rotational movement to be transferred from said motor drive shaft to said winch drive shaft while allowing longitudinal movement of said winch drive shaft relative to said motor drive shaft; and (e) electrical energy means including a source of electrical energy, electrical conductor means electrically coupled to said source of electrical energy and to said electric motor means for allowing the transfer of electrical energy from said source of electrical energy to said electric motor means, and a double pole double throw switch member interposed in said electrical conductor means between said source of electrical energy and said electric motor means for being closed in a first position to cause said motor drive shaft to rotate in a first direction to lift said attachment means and said spare tire assembly to said stored position and for being closed in a second position to cause said motor drive shaft to rotate in a second direction to lower said attachment means and said spare tire assembly to said lowered position.

2. The apparatus of claim 1 in which said coupling means includes joining means operatively joining said first and second coupling members thereof to one another for allowing said second coupling member to transfer rotation from said motor drive shaft to said first coupling member and for allowing back and forth longitudinal movement of said first and second coupling members relative to one another.

3. The apparatus of claim 2 in which said winch drive shaft has a threaded distal end, and in which said first coupling member has a threaded aperture for allowing said first coupling member to be screwed onto said distal end of said winch drive shaft.

4. The apparatus of claim 3 in which said second coupling member includes a first gear member fixedly attached to said motor drive shaft for being rotated thereby, and in which said second coupling member includes a second gear member for being operatively joined to said first coupling member by said joining means and for being rotated by said first gear member.

5. The apparatus of claim 4 in which said joining means includes a first joining member fixedly attached to said first coupling member for rotation therewith, and in which said joining means includes a second joining member fixedly attached to said second coupling member for rotation therewith, said first joining member having a longitudinal slot therein for receiving said second joining member and for allowing rotational movement to be transferred from said second joining member to said first joining member while allowing longitudinal movement of said first joining member relative to said second joining member.

6. The apparatus of claim 5 in which said first joining member has a bar for extending transversely across said slot therein, and in which said second joining member has a slot therein for receiving said bar of said first joining member when said second joining member is received in said slot of said first joining member to maintain alignment of said first and second joining members.

7. The apparatus of claim 6 in which said switch means includes a key-operated switch for being located on said vehicle adjacent said spare tire assembly and for preventing unauthorized operation of said apparatus.

8. The apparatus of claim 6 in which said switch means includes a switch member mounted within the interior of said vehicle.

9. The apparatus of claim 6 in which rotation of said motor drive shaft in a clockwise direction causes said winch means to lift said spare tire assembly to said stored position, and in which said winch means includes a locking mechanism for preventing said spare tire assembly from being lowered once it has been lifted to said stored position until said motor drive shaft is rotated in a counterclockwise direction.

10. The apparatus of claim 6 in which said winch means includes a cable member having a distal end, in which said attachment means includes a snap member for being fixedly attached to said distal end of said cable member and includes a hub member for being removably attached to said snap member and to said spare tire assembly.

* * * * *